United States Patent Office 3,794,642
Patented Feb. 26, 1974

3,794,642
OXIDATION OF SUBSTITUTED METHANES
TO THE CORRESPONDING SUBSTITUTED
METHANOLS
Thomas J. Kress, Indianapolis, Ind., assignor to Eli Lilly
and Company, Indianapolis, Ind.
No Drawing. Continuation-in-part of abandoned application Ser. No. 168,343, Aug. 2, 1971. This application Jan. 15, 1973, Ser. No. 323,498
Int. Cl. C07d 31/28
U.S. Cl. 260—251 R
9 Claims

ABSTRACT OF THE DISCLOSURE

The present invention is directed to the following process:

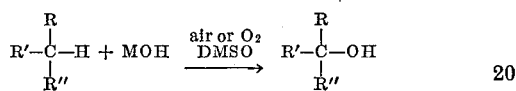

wherein M is an alkali metal; and R, R' and R" are phenyl or substituted-phenyl; alternately, R and R" can be aromatic heterocyclic; and alternately, R' can be loweralkyl, cycloalkyl, benzyl or naphthylmethyl.

CROSS-REFERENCE TO RELATED APPLICATION

This is a continuation-in-part of my copending application Ser. No. 168,343, filed Aug. 2, 1971.

BACKGROUND OF THE INVENTION

Substituted methanols (carbinols) are useful biological agents and chemical intermediates. The fungicidal activity of substituted methanols is described, for example, in Belgian Pat. 714,003. Because some substituted methanes are synthesized more easily than are the corresponding methanols, there is industrial interest in finding more economical routes to substituted methanols from the corresponding substituted methanes.

Russell et al. in J. Amer. Chem. Soc. 88, 549 (1966) taught the oxidation of triphenylmethane in t-butanol and dimethyl sulfoxide in the presence of potassium t-butoxide with oxygen. Russell et al. found that t-butanol was essential in this process in order to prevent oxidation of the dimethyl sulfoxide; they did not teach air as a suitable source of oxygen.

DESCRIPTION OF THE PRESENT INVENTION

I have discovered that the presence of an alkali-metal hydroxide makes it possible to oxidize various substituted methanes, within reasonable steric limits, to the corresponding methanols, using air as the oxygen source and dimethyl sulfoxide (DMSO) as sole solvent. The reactions proceed cleanly and give good yields. Oxygen may be used instead of air.

The substituted methane to be oxidized according to this invention is a compound of the formula:

(I)

R'—C—H
  |
  R"
  |
  R wherein
R is

pyridyl, 5-pyrimidinyl, or 2-pyrazinyl;
R' is $C_1$–$C_6$ alkyl, $C_3$–$C_6$ cycloalkyl,

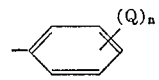

benzyl or naphthylmethyl;
R" is

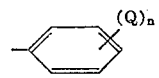

pyridyl, thienyl, or furyl;
each Q is independently chloro, bromo, fluoro, iodo, $C_1$–$C_4$ alkyl, nitro, amino, cyano, acetyl, methoxy or trifluoromethyl; and
n is an integer of from 0 to 3;

with the limitations that:
 (a) when Q is amino, cyano, acetyl, nitro, branched alkyl, or trifluoromethyl, n is 1;
 (b) when R' is alkyl, cycloalkyl, benzyl or naphthylmethyl, one of R or R" must be phenyl bearing an electron-withdrawing group in the para position; and
 (c) of all phenyl positions ortho to the central carbon atom, only one may bear a Q substituent.

"Alkyl" as used herein represents both straight- or branched-chain. As will be apparent to those skilled in the art, the term "central methyl carbon" refers to the carbon atom represented by "C" in Formula I.

As defined above, when R' is alkyl, cycloalkyl, benzyl or naphthylmethyl, R or R" must be substituted in a para position with an electron-withdrawing group. Representative electron-withdrawing groups include halo, nitro, cyano, acetyl, or trifluoromethyl. Consistent with the remainder of the generic definition, this para-substituted phenyl moiety is a mono-substituted moiety when the electron-withdrawing group is nitro, cyano, acetyl or trifluoromethyl; when the electron-withdrawing group is halo, the para-substituted phenyl moiety may be mono-, di- or tri-substituted.

Since the process of this invention is a general method of synthesis, the products are diverse and may have several utilities. Generally, the products of the present process are useful fungicides (see, for example, U.S. 3,396,224 and U.S. 3,544,682) and are intermediates to other useful fungicides (illustratively, U.S. 3,655,899 and 3,655,- 900; Belg. 754,501 and 754,506). In another aspect, amino-substituted-triphenylmethanols are well known as useful intermediates in the dye industry (for a discussion and further references, see Kirk-Othmer, "Encyclopedia of Chemical Technology," 2nd ed., vol. 20, pp. 672–737).

The starting tri-substituted methanes can be prepared by a variety of well-known methods. A good discussion of methods of preparing triphenylmethane and substituted triphenylmethanes is found in "Chemistry of Carbon Compounds," E. H. Rodd, ed., Elsevier Publishing Company, vol. III, 1956, pp. 1078–1081. Examples of synthetic methods for representative pyridylmethane derivatives are found in U.S. 2,727,895; U.S. 3,396,224 and U.S. 3,397,273. Methods of making 2-pyrazinylmethane derivatives are found in U.S. 3,544,682 and in J. Org. Chem. 26, 3379 (1961). The remaining starting methanes can

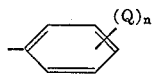

be prepared by similar synthetic methods, some of which are illustrated in the following equations:

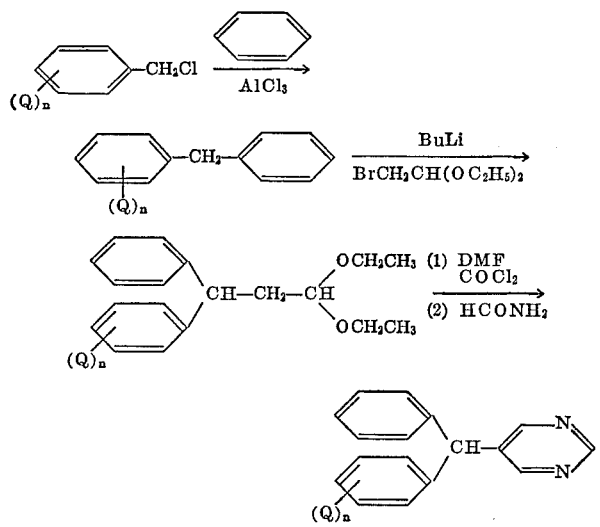

The above reaction is useful when Q is halo, nitro or trifluoromethyl; the other phenyl group can also be halo-substituted in the para position.

An alternate synthetic approach is useful when R' is alkyl, cycloalkyl, aralkyl or

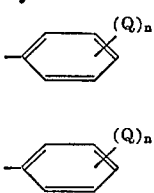

and R" is

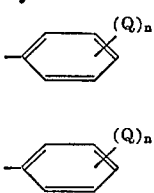

Q can be nitro, halo, loweralkyl or trifluoromethyl. This approach is exemplified by the following equation:

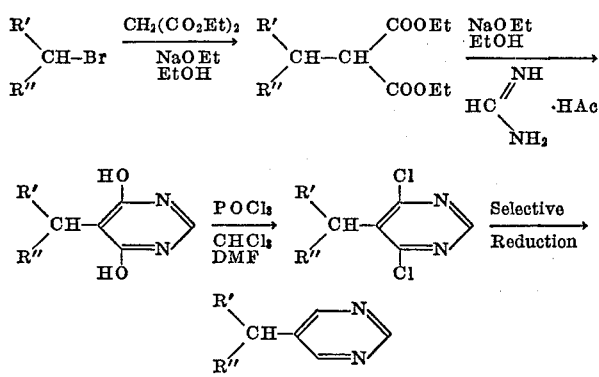

In carrying out the practice of the present invention, dimethyl sulfoxide of ordinary laboratory or industrial purity may be employed successfully. The relative amounts of substituted methane to dimethyl sulfoxide can be adapted within broad limits, but the methane must be sufficiently dissolved in DMSO for reaction to occur.

The air employed in the oxidation should be free from most suspended particles. If humidity is high, it is preferable to dry the air in a drying tube before introducing it to the reaction.

A good industrial grade alkali-metal hydroxide should be used for the reaction. Since the reaction rate appears to be proportional to the surface area of the hydroxide, a finely powdered hydroxide is usually preferred. Sodium hydroxide works well, is inexpensive, and is thus preferred; but lithium or potassium hydroxide can be used as well.

In representative oxidations according to the present invention, when using amounts of substituted methane on the order of 0.05 mole, dissolved in about 100 ml. of dimethyl sulfoxide, and in the presence of finely powdered sodium hydroxide (0.05 mole), reactions are routinely complete in about 2 to 3 hours. The reactions are generally exothermic, with temperature increases in the range of 10° C. to 50° C. in the absence of means for removing heat.

In carrying out the present invention, the substituted methane usually is dissolved in dimethyl sulfoxide before addition of the powdered alkali-metal hydroxide. The particle size and amount of alkali-metal hydroxide can be varied to control the rate of reaction and to minimize the need for heat-transfer apparatus.

The reaction of this invention proceeds with good yields when the prepared reaction mixture is allowed to stand for 2 to 3 days in an open beaker. The reaction goes forward more rapidly, however, when air is introduced through a tube below the surface of the reaction mixture. Understandably, since the reaction goes forward in the presence of unagitated air or with systematic air dispersal through the reaction mixture, it goes forward similarly when oxygen is employed. When using oxygen, as from a compressed cylinder or generator or the like, reaction time is approximately one-fourth that when air is employed. The same total exothermic energy is released, but over a shorter period of time resulting in greater exothermic temperature increases, frequently in the range of 40–50°. If oxygen is used, cooling the reaction mixture may be necessary.

In a typical workup, the reaction mixture is poured into cold water (about 3 volumes) with continuous stirring, whereupon a solid usually precipitates. The resulting aqueous mixture is adjusted to about pH 7, for example with concentrated hydrochloric acid, to neutralize remaining alkali-metal hydroxide. The solid is collected, washed with water, and dried. Occasionally, when the product is a liquid to gummy material, the pH-adjusted aqueous phase is extracted with an organic solvent. Extraction with chloroform (about ¼ volumes) has given satisfactory results. Such chloroform extract is thoroughly washed with water (equal volumes) to remove dimethyl sulfoxide. The washed chloroform solution is dried over a drying agent, such as anhydrous magnesium sulfate; the drying agent is removed by filtration; and the resulting chloroform solution is evaporated, preferably under vacuum, to give the desired product.

The following examples are provided in order to more fully illustrate the process of the present invention.

Example 1

Finely powdered sodium hydroxide (2 g., 0.05 mole) was added to a solution of α,α-diphenyl-2-pyridinemethane (12.2 g., 0.05 mole) in dimethyl sulfoxide (100 ml.) with stirring. Oxygen was introduced by a glass-frit addition tube for about 30 minutes. At this time the reaction temperature had increased to about 70° C. The reaction mixture was poured into cold water (300 ml.) with swirling, whereupon a solid precipitated. The reaction mixture was adjusted to pH 7 with concd. hydrochloric acid. The solid was collected by filtration, washed with water, and dried to give 12.3 g. of α,α-diphenyl-2-pyridinemethanol, M.P. 100–103° C. [lit. (Chem. Ber. 61, 547) 105° C.]. The identity of the product was confirmed by infrared spectrum [(CHCl$_3$) 3350 cm.$^{-1}$] and nuclear magnetic resonance spectrum [(CDCl$_3$) δ3.73 (s., O$\underline{H}$)].

Example 2

The procedure of Example 1 was followed, except that air was used instead of oxygen. The reaction temperature rose to only about 30° C.; reaction time was increased to about 2½ hours. The subsequent purification and characterization of the product were essentially identical.

Example 3

α,α-Diphenyl-3-pyridinemethane (12.2 g., 0.05 mole) was reacted by the method of Example 1, except that after adjustment of the product solution to pH 7, it was necessary to extract 3 times with chloroform (100 ml. each). The combined chloroform extract was washed twice with water (100 ml. each), was dried and evaporated under vacuum to give 12.2 g. of glassy liquid which crystallized from pentane. The product was recrystallized from ethyl acetate-hexane to give 11 g. of α,α-diphenyl-3-pyridinemethanol, M.P. 120–121° C. [lit. (J. Amer. Chem. Soc. 73, 469) 115° C.]. A second crop of 11.4 g. was crystallized (87% yield).

Example 4

The procedure of Example 3 was followed, except that air was used instead of oxygen. Although the reaction time was longer, the product was identical with the product of Example 3.

Example 5

α,α-Diphenyl-4-pyridinemethane (12.2 g., 0.05 mole) was converted by the method of Example 1 to give 12.7 g. (97% yield) of white, powdery α,α-diphenyl-4-pyridinemethanol, M.P. 233–235° C. [lit. (Chem. Ber. 61, 547) 235° C.].

Example 6

α,α-Diphenyl-5-pyrimidinemethane (12.2 g., 0.05 mole) was converted by the method of Example 1 to give 12.6 g. (96.3% yield) of α,α-diphenyl-5-pyrimidinemethanol, crystallized from ethyl acetate, M.P. 166–169° C.

*Analysis.*—Calcd. for $C_{17}H_{14}N_2O$ (percent): C, 77.84; H, 5.38; N, 10.68. Found (percent): C, 77.59; H, 5.65; N, 10.49.

Example 7

α - (2,4 - Dichlorophenyl) - α - phenyl - 5 - pyrimidinemethane (14.3 g., 0.045 mole) was converted by the method of Example 1 to give 10.9 g. of white, crystalline (from cyclohexane) α-(2,4-dichlorophenyl)-α-phenyl-5-pyrimidinemethanol, M.P. 97–98° C.

*Analysis.*—Calcd. for $C_{17}H_{12}Cl_2N_2O$ (percent): C, 61.64; H, 3.65; N, 8.46. Found (percent): C, 61.55; H, 3.72; N, 8.61.

Example 8

α,α-Diphenyl-2-pyridinemthanol is prepared by the method of Example 2 except that potassium hydroxide (0.05 mole) is used in lieu of sodium hydroxide.

Example 9

α - (2,4 - Dichlorophenyl) - α - phenyl - 5 - pyrimidinemethanol is prepared by the method of Example 7, but using lithium hydroxide instead of sodium hydroxide.

Examples 10 to 51

Other representative compounds prepared by the process of the present invention from the corresponding trisubstituted-methane, as exemplified hereinabove, include:

α,α,α-triphenylmethanol
α,α,α-tris(4-aminophenyl)methanol
α,α-bis(3-chlorophenyl)-3-pyridinemethanol
α,α-bis(4-fluorophenyl)-3-pyridinemethanol
α - (4-chlorophenyl)- α -(4-trifluoromethylphenyl)-3-pyridinemethanol
α,α-bis(4-chlorophenyl)-3-pyridinemethanol
α,α-bis(m-tolyl)-3-pyridinemethanol
α,α-bis(3-bromophenyl)-3-pyridinemethanol
α,α-bis(3,4-dichlorophenyl)-3-pyridinemethanol
α-(4-iodophenyl)-α-phenyl-3-pyridinemethanol
α,-bis(p-tolyl)-5-pyrimidinemethanol
α-phenyl-α-(2-thienyl)-3-pyridinemethanol
α,α-bis(3-methoxyphenyl)-5-pyrimidinemethanol
α,α-diphenyl-α-(3-isopropylphenyl)methanol
α,α,α-tris(4-t-butylphenyl)methanol
α-benzyl-α-(4-nitrophenyl)-3-pyridinemethanol
α-(4-acetylphenyl)-α-(n-hexyl)-3-pyridinemethanol
α-(4-nitrophenyl)-α-(1-naphthylmethyl)-3-pyridinemethanol
α-(n-propyl)-α-(4-nitrophenyl)-2-thiophenemethanol
α-(4-cyanophenyl)-α-ethyl-5-pyrimidinemethanol
α-(4-cyanophenyl)-α-methyl-3-pyridinemethanol
α,α-bis(3-pyridyl)-α-phenylmethanol
α-(4-acetylphenyl)-α-cyclopropyl-3-pyridinemethanol
α-cyclobutyl-α-(4-nitrophenyl)-3-pyridinemethanol
α,α-bis(p-tolyl)-2-pyrazinemethanol
α-methyl-α-(4-nitrophenyl)-2-pyrazinemethanol
α-(4-cyanophenyl)-α-cyclopentyl-2-pyrazinemethanol
α-cyclobutyl-α-(4-nitrophenyl)-2-pyridinemethanol
α-(2-thienyl)-α-phenyl-2-pyrazinemethanol
α-(2-furyl)-α-(p-tolyl)-2-pyrazinemethanol
α-phenyl-α-(4-chlorophenyl)-2-pyridinemethanol
α,α-bis(4-chlorophenyl)-2-pyridinemethanol
α,α-diphenyl-2-pyrazinemethanol
α-(4-bromophenyl)-α-phenyl-4-pyridinemethanol
α,α-diphenyl-α-(2,4,5-trichlorophenyl)methanol
α-(2,4-difluorophenyl)-α-phenyl-3-pyridinemethanol
α-(2,4-dichlorophenyl)-α-phenyl-3-pyridinemethanol
α-(2-chlorophenyl)-α-(4-fluorophenyl)-5-pyrimidinemethanol
α-(2,4-difluorophenyl)-α-phenyl-5-pyrimidinemethanol
α-(2-chlorophenyl)-α-phenyl-5-pyrimidinemethanol
α-(2-chlorophenyl)-α-(4-chlorophenyl)-5-pyrimidinemethanol
α-(2,4-dichlorophenyl)-α-cyclohexyl-5-pyrimidinemethanol

I claim:

1. A process for preparing a trisubstituted-methanol from the corresponding trisubstituted-methane of the formula:

$$\begin{array}{c} R \\ | \\ R'-C-H \\ | \\ R'' \end{array}$$

wherein
R is

pyridyl, 5-pyrimidinyl, or 2-pyrazinyl;
R' is $C_1$–$C_6$ alkyl, $C_3$–$C_6$ cycloalkyl,

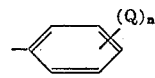

benzyl or naphthylmethyl;
R'' is

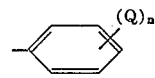

pyridyl, thienyl, or furyl;
each Q is independently chloro bromo, fluoro, iodo, $C_1$–$C_4$ alkyl, nitro, amino, cyano, acetyl, methoxy or trifluoromethyl; and
n is an integer of from 0 to 3;
with the limitations that:
(a) when Q is amino, cyano, acetyl, nitro, branched alkyl, or trifluoromethyl, n is 1;
(b) when R' is alkyl, cycloalkyl, benzyl or naphthylmethyl, one of R or R'' must be phenyl bearing an electron-withdrawing group in the para position; and
(c) of all phenyl positions ortho to the central carbon atom, only one may bear a Q substituent;
which process comprises reacting said trisubstituted-methane with air or oxygen in the presence of an alkali-metal hydroxide in dimethyl sulfoxide and recovering said trisubstituted-methanol.

2. The process of claim 1 wherein the trisubstituted-methanol is α-(2,4-dichlorophenyl)-α-phenyl-5-pyrimidinemethanol.

3. The process of claim 1 wherein the trisubstituted-methanol is α,α,α-triphenylmethanol.

4. The process of claim 1 wherein the trisubstituted-methanol is α,α-diphenyl-3-pyridinemethanol.

5. The process of claim 1 wherein the trisubstituted-methanol is α-(2-chlorophenyl)-α-(4-chlorophenyl)-5-pyrimidinemethanol.

6. The process of claim 1 wherein the trisubstituted-methanol is α-(2,4-dichlorophenyl)-α-cyclohexyl-5-pyrimidinemethanol.

7. The process of claim 1 wherein the trisubstituted-methanol is α,α-bis(4-fluorophenyl)-3-pyridinemethanol.

8. The process of claim 1 wherein the alkali-metal hydroxide is sodium hydroxide.

9. The process of claim 8 wherein the trisubstituted-methanol is α-(2,4-dichlorophenyl)-α-phenyl-5-pyrimidinemethanol.

No references cited.

HENRY R. JILES, Primary Examiner

M. A. M. CROWDER, Assistant Examiner

U.S. Cl. X.R.

260—250 B, 256.4 R, 256.5 R, 294.8 D, 294.9, 296 R, 297 R, 332.3 R, 347.7, 347.8, 390, 395, 465 F, 570 R, 590, 618 C, 687